(12) United States Patent
Chakrabarti et al.

(10) Patent No.: US 7,616,466 B2
(45) Date of Patent: Nov. 10, 2009

(54) THREE PHASE INVERTER WITH IMPROVED LOSS DISTRIBUTION

(75) Inventors: Sibaprasad Chakrabarti, Torrance, CA (US); Silva Hiti, Redondo Beach, CA (US); George John, Cerritos, CA (US); Gregory S. Smith, Woodland Hills, CA (US); Milun Perisic, Torrance, CA (US); Gholamreza Esmaili, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 79 days.

(21) Appl. No.: 11/853,873

(22) Filed: Sep. 12, 2007

(65) Prior Publication Data

US 2009/0067203 A1    Mar. 12, 2009

(51) Int. Cl.
*H02M 7/5387* (2007.01)
*H02P 27/04* (2006.01)

(52) U.S. Cl. .................. 363/132; 363/98; 318/801; 318/811

(58) Field of Classification Search ............ 363/98, 363/131, 132; 318/139, 254, 430, 434, 801, 318/809–811
See application file for complete search history.

(56) References Cited

U.S. PATENT DOCUMENTS

| | | | | |
|---|---|---|---|---|
| 3,960,619 | A * | 6/1976 | Seiter | 117/97 |
| 6,014,497 | A * | 1/2000 | Kerkman et al. | 388/811 |
| 6,313,602 | B1 * | 11/2001 | Arefeen et al. | 318/801 |
| 6,680,593 | B2 * | 1/2004 | Gotou | 318/400.04 |
| 6,819,078 | B2 * | 11/2004 | Ho | 318/808 |
| 7,061,134 | B2 | 6/2006 | Hiti et al. | |
| 7,119,530 | B2 * | 10/2006 | Mir et al. | 324/76.15 |
| 7,161,323 | B2 * | 1/2007 | Ajima et al. | 318/629 |
| 7,164,254 | B2 * | 1/2007 | Kerkman et al. | 318/812 |
| 7,199,540 | B2 * | 4/2007 | Yaguchi | 318/432 |
| 7,310,475 | B2 * | 12/2007 | Okuda et al. | 388/805 |
| 2006/0001392 | A1 * | 1/2006 | Ajima et al. | 318/432 |
| 2007/0182349 | A1 * | 8/2007 | Fujita et al. | 318/145 |

OTHER PUBLICATIONS

Blasko, V., et al., "Sampling of Discontinuous Voltage and Current Signals in Electrical Drives: A System Approach," IEEE Transactions on Industry Applications, 1998, pp. 1123-1130, vol. 34, No. 5.
Hava, A. M., et al. "A High-Performance Generalized Discontinuous PWM Algorithm," IEEE Transactions on Industry Applications, 1998, pp. 1059-1071, vol. 34, No. 5.

* cited by examiner

*Primary Examiner*—Jessica Han
*Assistant Examiner*—Emily Pham

(57) ABSTRACT

An inverter circuit couples a DC voltage source having a primary side and a reference side to an electric motor or other AC machine having multiple electrical phases. An inverter circuit includes switches, diodes and a controller. For each of the electrical phases, a first switch couples the electrical phase to the primary side of the DC voltage source and a second switch couples the electrical phase with the reference side of the DC voltage source. For each of the first and second switches, an associated anti-parallel diode is configured to provide an electrical path when the switch associated with the diode is inactive. The controller is coupled to the switching inputs of each of the first and second switches and is configured to provide a control signal thereto, wherein the control signal provided to each switch comprises, in a low frequency mode, a first portion and a second portion, wherein the first portion comprises a first pulse width modulation scheme and the second portion comprises a second pulse width modulation scheme different from the first modulation scheme.

17 Claims, 2 Drawing Sheets

THREE PHASE INVERTER WITH IMPROVED LOSS DISTRIBUTION

TECHNICAL FIELD

The present invention generally relates to electric motors, and more particularly relates to three-phase inverters used in electric motors found in hybrid vehicles and other applications.

BACKGROUND

In recent years, so-called "hybrid vehicles" have become increasingly popular. These vehicles typically supplement the power produced by a more-conventional internal combustion engine with power generated by one or more electric motors, thereby dramatically reducing fuel consumption without significant effects upon the driving experience.

Despite the success of hybrid vehicles, however, it is always desirable to provide increasing levels of power from the electric motor(s) present on the vehicle. Typically, increased power can be obtained by providing additional motors, larger motors, larger magnet structures in the existing motors, and/or by boosting the electrical current driven through the armature coils of the motor during operation. More particularly, inverter circuits have been designed to increase the power provided within the electric motor system. A conventional six-switch, three-leg inverter topology, for example, can increase the power of a system that includes one or more three-phase motors. Even this arrangement, however, can be limited in its ability to increase available power and/or to decrease the current rating of the inverter. In particular, thermal constraints at low fundamental operating frequencies can make it difficult for conventional inverter circuits to produce desired levels of current, thereby resulting in decreased motor torque at low speeds.

Accordingly, it is desirable to provide an improved inverter scheme for obtaining increased power from a multi-motor system without adding complexity to the system or increasing the motor size. In particular, it is desirable to address temperature effects on inverter operation to produce additional motor torque at low fundamental frequencies. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In various embodiments, an inverter circuit couples a DC voltage source having a primary side and a reference side to an electric motor or other AC machine having a plurality of electrical phases. The inverter circuit includes switches, diodes and a controller. For each of the electrical phases, a first switch couples the electrical phase to the primary side of the DC voltage source and a second switch couples the electrical phase with the reference side of the DC voltage source. For each of the first and second switches, an associated antiparallel diode is configured to provide an electrical path when the switch associated with the diode is inactive. The controller is coupled to the switching inputs of each of the first and second switches and is configured to provide a control signal thereto, wherein the control signal provided to each switch comprises a first portion and a second portion, wherein the first portion comprises a first pulse width modulation scheme and the second portion comprises a second pulse width modulation scheme different from the first modulation scheme. Examples of first and second PWM schemes include discontinuous pulse width modulation (DPWM) maximum or minimum schemes, space vector modulation schemes, and/or the like.

DESCRIPTION OF THE DRAWINGS

The present invention will hereinafter be described in conjunction with the following drawing figures, wherein like numerals denote like elements.

DETAILED DESCRIPTION OF EXEMPLARY EMBODIMENTS

The following description generally relates to methods and systems for storing and boosting the electrical power available in a multi-motor electrical system such as that found on many hybrid automobiles, trucks and other vehicles. Equivalent concepts, however, may be readily applied in other vehicular, industrial, aerospace and/or other settings. Indeed, the various concepts described herein may be readily adapted to any modulated inverter system whatsoever. In this regard, the following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Generally speaking, thermal issues arise within inverter circuits that are associated with electric motors because the various components (e.g. transistors, diodes) present within the inverter circuit dissipate heat energy at uneven rates, particularly at low fundamental operating frequencies. By adjusting the modulation of the various phases of the electrical motor, however, electrical energy can be applied in a manner that distributes heat dissipation throughout the inverter circuit, thereby allowing for additional current to be driven through the inverter, which in turn allows for additional motor torque even at relatively low operating frequencies.

Figure 1:
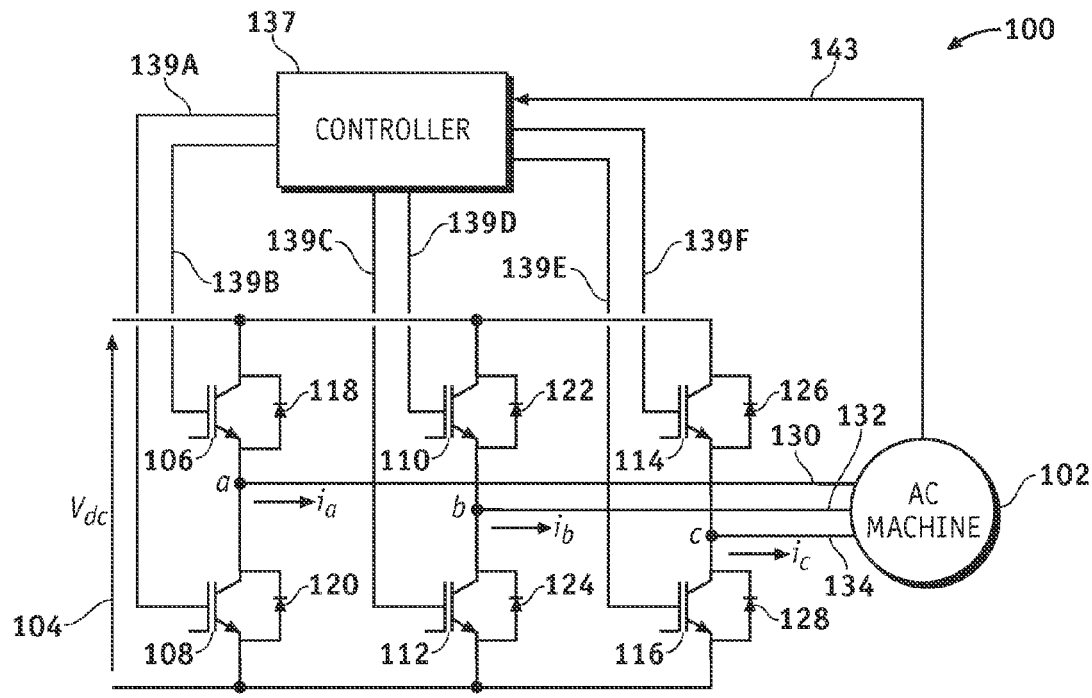
FIG. 1 is a circuit diagram of an exemplary three-phase inverter.

With reference now to the drawing figures and initial reference to FIG. 1, an exemplary electrical inverter system suitable for use in an automobile, truck or other vehicle includes a battery or other power source 104 coupled with an electrical machine 102 via an inverter circuit 100. Inverter circuit 100 suitably applies the electrical energy from source 104 across the multiple electrical phases 130, 132, 134 of machine 102. This energy is typically applied in response to various pulse width modulations (PWM) or other control signals 139A-F generated by a digital controller 137 and provided to switching components within circuit 100 as appropriate.

In the exemplary inverter circuit 100 shown in FIG. 1, electrical current is applied to each of the three electrical phases 130, 132, 134 of AC machine 102 using three sets of switching elements, shown in FIG. 1 as switches 106-116. Switches 106 and 108 can be activated by signals 139A and 139B, respectively, to apply positive or negative current to phase 130, with switches 110 and 112 activated by signals 139C-D to apply positive or negative current to phase 132, and switches 114 and 116 activated by signals 139E-F to apply positive or negative current to phase 134, respectively. In various embodiments, switches 106-116 are implemented with insulated gate bipolar transistors (IGBTs), metal oxide semiconductor field effect transistors (MOSFETs), and/or the like. Such transistors typically provide a common terminal (e.g. a base or gate terminal) that can be driven with a control signal 139A-F to a relatively high or low voltage to thereby enable electrical conductivity between the remaining terminals of the device.

In the embodiment shown in FIG. 1, each switch 106-116 is shown configured in anti-parallel with a diode 118-128. Generally speaking, each diode conducts electrical current when its companion parallel switch is in an inactive state. The diode, however, carries current in the opposite direction that its companion switch carries. Diode 120, for example, typically conducts current when switch 108 is active, but not when switch 106 is active. Diode 118, conversely, typically conducts current while switch 106 is activated, but not when switch 108 is active. Switches 110, 112, 114 and 116 in the FIG. 1 embodiment are shown similarly paired with diodes 124, 122, 128 and 126, respectively. Generally speaking, a desired AC or DC voltage can be applied on any of the three phases 130, 132, 134 by adjusting the time durations that each switching element 106-116 remain active. Additional details of exemplary voltage source inverter circuits are described in U.S. Pat. No. 7,061,134, although many equivalent inverter topologies and operating schemes could be used in other embodiments.

Controller 137 is any device, module, circuitry, logic and/or the like capable of providing control signals 109A-F to the various components of inverter circuit 100. Controller 137 may be implemented with a conventional microprocessor or microcontroller, for example, which would typically include software or firmware instructions stored in volatile or non-volatile digital memory. In other embodiments, controller 137 is implemented with programmed gate arrays, look-up tables or other logic circuitry of any kind. Although not shown in FIG. 1, controller 137 may be physically coupled to switches 106-116 via any type of multiplexing/de-multiplexing or other decoding circuitry to reduce the number of logic pins or other outputs on controller 137 used to provide signals 139A-F. Further, controller 137 may receive any sort of input signal 143 from AC machine 102 or any sensor associated therewith to indicate the presence of a low frequency operating condition, as described more fully below.

Source 104 is any battery, generator, fuel cell or other source of electrical energy for application to inverter circuit 100. Generally, the power source corresponds to a conventional hybrid vehicle battery or series of batteries providing direct current (DC) to system 100. In the exemplary embodiment of FIG. 1, source 104 is simply shown as a relative voltage (VDC) applied between two input terminals of inverter 100, which may be applied in any conventional manner.

AC machine 102 is any type of induction motor or the like having any number of inductive windings corresponding to any number of electrical phases. The embodiment of AC machine 102 shown in FIG. 1, for example, has three electrical phases, although equivalent embodiments could make use of two, four or any other number of inductive phases. AC machine 102 operates according to conventional electrical principles. By alternately connecting the various windings 130, 132, 134 to power source 104, for example, various electrical paths can be formed and altered as appropriate to generate mechanical torque applied to any number of wheels, flywheels or other mechanical loads.

Figure 2:
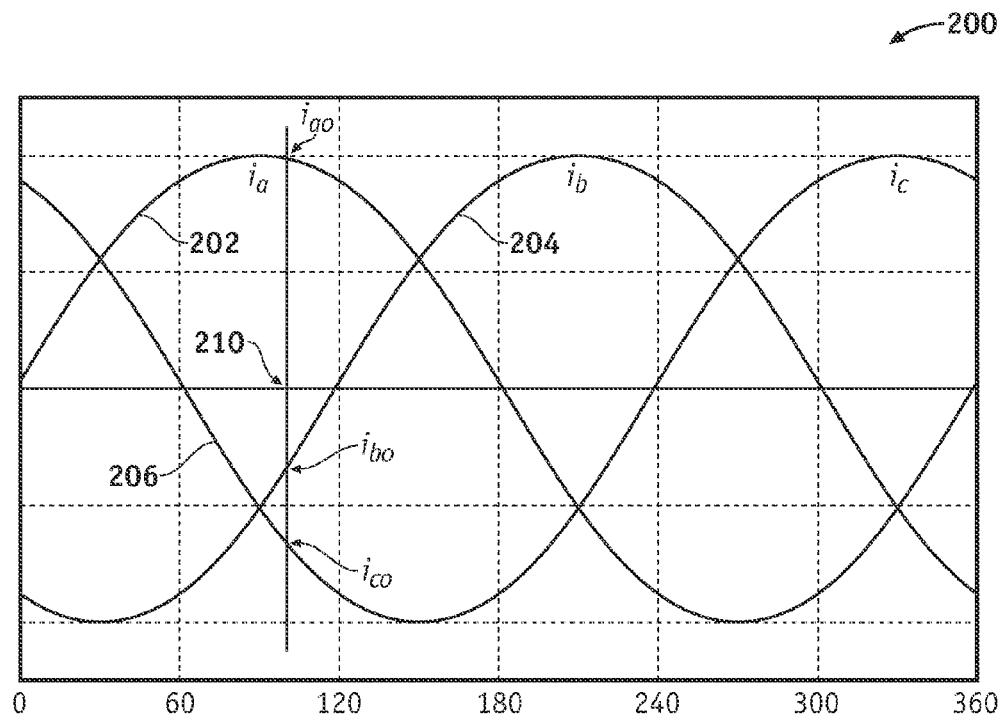
FIG. 2 is a plot of exemplary three-phase currents in the inverter.

In the embodiment shown in FIG. 1, each of the electrical phases 130, 132, 134 can be switchably coupled to either the positive or negative terminals of power source 104 by the various components of inverter circuit 100, thereby allowing either full rail voltage or zero voltage across any two of the phases 130, 132, 134 in either direction. Switches 106, 110 and 114, for example, switchably couple phases 130, 132, 134 (respectively) to the positive voltage (or primary) side of power source 104, while switches 108, 112, 116 couple phases 130, 132, 134 (respectively) to the opposite (e.g. negative or reference) side of power source 108. To apply a positive or negative voltage between any two of the phases 130, 132, 134, then, one or more switches 106-116 associated with the winding can be activated using one or more appropriate control signals 139A-F. To apply positive voltage during a time interval between phases 130 and 132, for example, phase 130 is coupled to the positive side of power source 104 (i.e. switch 106 is activated with signal 139B) and phase 132 is coupled to the negative side of power source 104 (i.e. switch 112 is activated with signal 139C). Current flow in the circuit depends on the polarity of the voltage applied and the power factor of the load connected. Hence, if the phase current in 130 has positive polarity (i.e. flows in the direction as shown in FIG. 1); it flows through the switch 106. Conversely, the current flows through the diode 118 if it has negative polarity. Similarly, the phase current in phase 132 will flow through either switch 112 or diode 124 depending on its negative or positive polarity respectively during that time interval FIG. 2 shows a plot of an exemplary balanced three-phase scheme wherein the total amount of electrical current applied to AC machine 102 remains relatively constant over time. At time 210, for example, the current in phase 130 (FIG. 1; shown as plot 202 in FIG. 2) is generally positive in magnitude, with the currents in phases 132, 134 (FIG. 1; shown as plots 204 and 206, respectively, in FIG. 2) being negative in sign, and the current in phase 134 (plot 206) having a more negative magnitude than the current in phase 132 (plot 204). Using the exemplary sign conventions shown in FIG. 1, the condition at time 210 would result in switch 106 and diode 120 providing a positive current on phase 130, switch 112 and diode 122 providing a negative current on phase 132, and switch 116 and diode 126 providing a negative current on phase 134. This particular time 210 is used below for exemplary purposes; it will be appreciated that the relative magnitudes and phases of signals 202, 204 and 206 will continually evolve during operation.

Again, the relative magnitudes of phase currents 130, 132, 134 can vary with respect to each other during AC operation, wherein the various switches 106-116 are activated and deactivated according to a suitable PWM or other modulation scheme at a fundamental operating frequency. During normal operation, the polarity of the phase currents typically changes relatively quickly (e.g. faster than the thermal time constants of the circuitry), so temperature is not generally a significant concern. During low frequency (or even DC) operation, however, the phase currents applied at any point in time can remain relatively constant for some period of time. Because switches 106-116 and diodes 118-128 produce heat in response to applied current, the prolonged unchanging currents can cause uneven heating of circuit 100. Continuing the FIG. 2 example, switches 106, 112 and 116 will dissipate heat during operation at time 210, as will diodes 120, 122 and 126. Little or no heat will be dissipated by the remaining components in inverter circuit 100, thereby creating an imbalance in the amount of heat dissipated by the various components at low frequencies. Moreover, it may be desirable to limit the amount of current provided to source 104 at some point, as one or more components near their maximal heat tolerances.

By using a more complex modulation scheme, however, the imbalance in active time (and hence the imbalance in heat dissipation) can be remedied while still applying the desired drive currents to each phase of the AC machine 102. A current regulator module in controller 137, for example, can be used to determine the voltages modulated at the various phase terminals 130, 132, 134. The regulator feature suitably splits the switching period, for example, between the two switches attached to each phase terminal 130, 132, 134 to share current between the switches.

Figure 3:
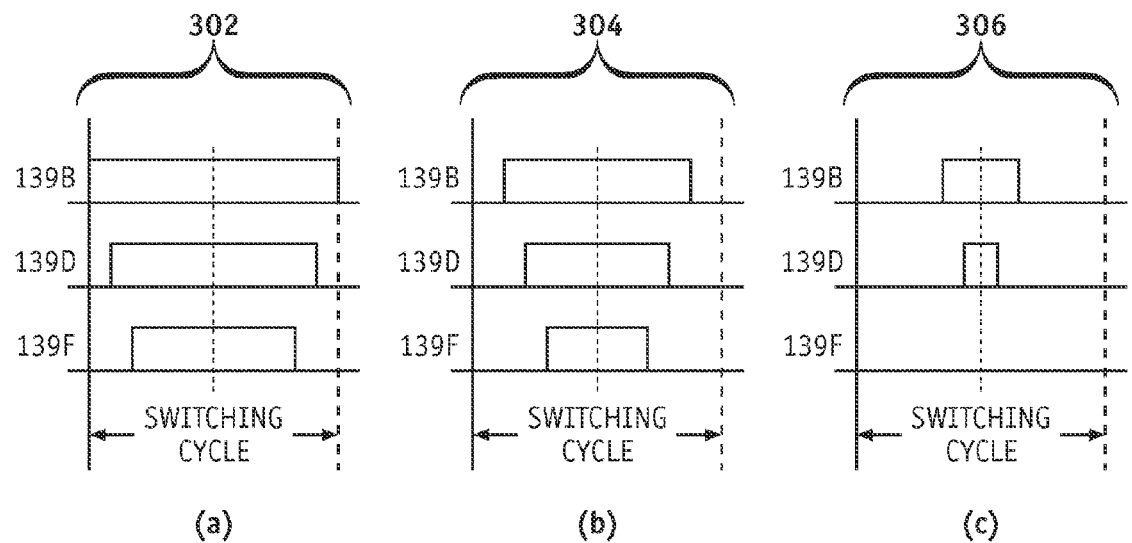
FIG. 3 shows various plots of exemplary modulation schemes.

When a low operating frequency condition is sensed (e.g. in response to input signal 143) at controller 137, the modulation signals 139A-F are suitably adjusted to compensate for the temperature effects that occur at or near DC operation. FIG. 3 provides three examples of pulse width modulation schemes that could be inter-combined in any manner or otherwise used in various embodiments to represent the three phase currents 130, 132, 134 at time 210 (FIG. 2). With reference now to FIG. 3, scheme 302 shows a conventional "discontinuous pulse width modulation-maximum zero sequence voltage" (DPWM-max) technique, with schemes 304 and 306 showing conventional "space vector modulation" (SVM) and "discontinuous pulse width modulation-minimum zero sequence voltage" (DPWM-min) modulations, respectively. With DPWM-max scheme 302, signal 139B (corresponding to switch 106) remains active for the entire switching cycle (thereby reducing heat losses due to state transitions. Signals 139D and 139F similarly remain active for a majority of the switching period. SVM scheme 304 reduces the amount of time that switch 106 remains active (in comparison to DPWM-max scheme 302), but adds on heat loss due to state transitions between switch 106 and diode 120. DPWM-min scheme 306 reduces conduction losses in switch 106 even further, but maintains the heat loss due to the switching transitions within the switching period. Other modulation schemes could be alternatively or additionally used in a wide array of equivalent embodiments.

Generally speaking, it is desirable that the active switch and diode pair that are carrying the greatest amount of current (e.g. switch 106 and diode 120 at time 210) operate at their maximal allowable temperature limits to maximize the amount of current available to the AC machine 102. Moreover, it is desirable that switch 106 and diode 120 (in this example) both operate at or near their maximal allowable temperature limits at the same time, which would not occur using any single one of the modulation schemes 302, 304, 306 shown in FIG. 3. Nevertheless, two or more PWM schemes can be combined to achieve greater operating temperatures in both the active switch and the active diode. These two schemes may be activated during low frequency operation, for example, to increase the amount of current provided to the active phase, which in turn would increase the amount of torque produced by the motor. Moreover, combining modulation schemes may allow for exploitation of different maximal operating temperatures between the switch and the diode (e.g. if the two components are fabricated on separate semiconductor dies, from separate materials, and/or the like). As diodes become increasingly available in silicon carbide (SiC) and other newer materials with higher temperature tolerances than conventional silicon, for example, this increased ability to absorb heat can be exploited as appropriate. Accordingly, IGBTs or other switches formed on silicon substrates can operate with diodes and/or other components formed on SiC or other substrates, and the modulations applied to the various components can be adjusted or otherwise modified to exploit any desirable thermal characteristics that may be available.

Figure 4:
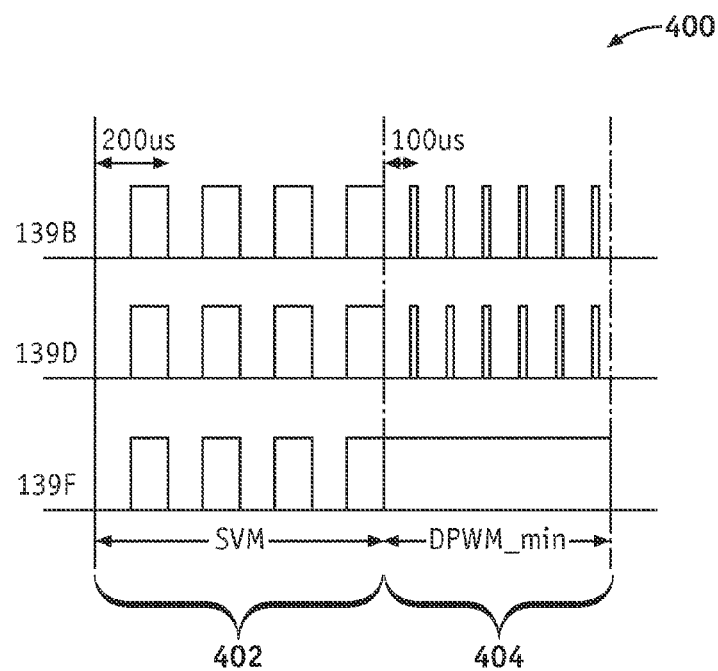
FIG. 4 is a timing diagram of various exemplary modulation schemes.

FIG. 4, for example, shows an exemplary modulation scheme 400 that combines a SVM portion 402 with a DPWM-min portion 404. In this example, the DPWM-min portion 404 operates at a higher frequency than period 402, although this feature need not be implemented in all embodiments. The SVM portion 402 provides an advantage of allowing current through both switch 106 and diode 120 almost 50% of the switching period at very low or zero fundamental operating frequency. The DPWM-min portion 404, however, significantly reduces the amount of current provided by switch 106 (in this example), thereby allowing for increased temperature margin (i.e. drop) in comparison to other modulation schemes.

Although FIG. 4 shows SVM portion 402 and DPWM-min portion 404 as being approximately co-equal in time period, other embodiments may disproportionately mix the two modulation schemes to further adjust heating effects of the modulation. Increased time spent in SVM modulation, for example, could provide certain performance benefits at the expense of increased heat dissipation in certain switches (e.g. switch 106 in the example above). The relative periods and durations of the various modulation portions 402, 404 may be computed within controller 137 and adjusted in real-time, and/or they may be programmed in advance of operation in any deterministic or non-deterministic manner.

The hybrid PWM scheme such as that shown in FIG. 4 need not be applied at all points during operation. In various embodiments, controller 137 identifies a "low operating frequency" condition, and applies the hybrid modulation only during such conditions. That is, the hybrid modulation need only be applied during a "low frequency" mode to prevent excess heat from building up on particular components during low frequency operation.

As noted at the outset, the various techniques described above may be applied in any number of environments and applications. In the vehicle context, inverter circuitry can be readily deployed in a hybrid vehicle or the like. Similar concepts may be equivalently applied in the context of any automotive, transportation, aerospace, industrial and/or other setting as appropriate.

While several exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An inverter circuit coupling a DC voltage source having a primary side and a reference side to an AC machine having a plurality of electrical phases, the inverter circuit comprising:
   for each of the plurality of electrical phases, a first switch coupling the electrical phase to the primary side of the DC voltage source and the second switch coupling the electrical phase with the reference side of the DC voltage source, wherein each of the first and second switches further comprise a switching input;
   for each of the first and second switches, an associated anti-parallel diode configured to provide an electrical path when the switch associated with the diode is inactive; and
   a controller coupled to the switching inputs of each of the first and second switches and configured to identify a low operating frequency condition of the AC machine and, in response thereto, to provide a control signal to each switch that comprises a first portion in time and a second portion in time, wherein the first portion applies a first pulse width modulation scheme and the second portion applies a second pulse width modulation scheme different from the first modulation scheme, wherein the first pulse width modulation scheme is a discontinuous pulse width modulation scheme.

2. The inverter circuit of claim 1 wherein the first and second pulse width modulation schemes are applied as the switches and anti-parallel diodes approach their maximum heat tolerances.

3. The inverter circuit of claim 1 wherein the second pulse width modulation scheme is a space vector modulation.

4. The inverter circuit of claim 1 wherein the discontinuous pulse width modulation scheme is based upon maximum zero sequence voltage.

5. The inverter circuit of claim 1 wherein the discontinuous pulse width modulation scheme is based upon minimum zero sequence voltage.

6. The inverter circuit of claim 1 wherein each of the first and second switches is an insulated gate bipolar transistor.

7. The inverter circuit of claim 6 wherein each of the first and second switches is formed on a silicon substrate.

8. The inverter circuit of claim 7 wherein each of the diodes are formed on a separate substrate from the silicon substrate.

9. The inverter circuit of claim 8 wherein the separate substrate is a silicon carbide substrate.

10. A method of coupling a DC voltage source having a primary side and a reference side to an AC machine having a plurality of electrical phases, the method comprising the steps of:
    controlling a plurality of switches each coupling one of the electrical phases to either the primary side or the reference side of the DC voltage source using a primary modulation scheme;
    identifying a low frequency operating condition; and
    in response to the low-frequency operating condition, applying a low frequency modulation scheme to each switch, wherein the low frequency modulation scheme comprises a first portion in time and a second portion in time, wherein the first portion applies a first pulse width modulation scheme and the second portion applies a second pulse width modulation scheme different from the first modulation scheme, wherein the first pulse width modulation scheme is a discontinuous pulse width modulation scheme.

11. The method of claim 10 wherein the second pulse width modulation scheme is a space vector modulation.

12. The method of claim 10 wherein the discontinuous pulse width modulation scheme is based upon maximum zero sequence voltage.

13. The method of claim 10 wherein the discontinuous pulse width modulation scheme is based upon minimum zero sequence voltage.

14. A system for coupling a DC voltage source having a primary side and a reference side to an AC machine having a plurality of electrical phases, the system comprising:
    means for controlling a plurality of switches each coupling one of the electrical phases to either the primary side or the reference side of the DC voltage source using a primary modulation scheme;
    means for identifying a low frequency operating condition; and
    means for applying a low frequency modulation scheme to each switch in response to the low-frequency operating condition, wherein the low frequency modulation scheme comprises a first portion in time and a second portion in time, wherein the first portion comprises a first pulse width modulation scheme and the second portion applies a second pulse width modulation scheme different from the first modulation scheme, wherein the first pulse width modulation scheme is a discontinuous pulse width modulation scheme.

15. The system of claim 14 wherein the second pulse width modulation scheme is a space vector modulation.

16. The system of claim 14 wherein the discontinuous pulse width modulation scheme is based upon a modulation scheme selected from the group consisting of: maximum zero sequence voltage and minimum zero sequence voltage.

17. The system of claim 14 wherein the first and second pulse width modulation schemes are applied as the switches approach their maximum heat tolerances.

* * * * *